United States Patent [19]
Hong et al.

[11] 3,714,629
[45] Jan. 30, 1973

[54] DOUBLE ERROR CORRECTING METHOD AND SYSTEM

[75] Inventors: Se J. Hong, Poughkeepsie; Arvind M. Patel, Wappingers Falls, both of N.Y.

[73] Assignee: International Business Machines Corporation, Armonk, N.Y.

[22] Filed: June 1, 1971

[21] Appl. No.: 148,773

[52] U.S. Cl. ................340/146.1 AL, 340/146.1 AV
[51] Int. Cl. ..............................................G06f 11/12
[58] Field of Search............340/146.1 AL, 146.1 AV

[56] References Cited

UNITED STATES PATENTS

| | | | |
|---|---|---|---|
| 3,533,067 | 10/1970 | Zierler et al. | 340/146.1 AL |
| 3,582,878 | 6/1971 | Bossen et al. | 340/146.1 AL |
| 3,601,800 | 8/1971 | Lee | 340/146.1 AL |
| 3,629,824 | 12/1971 | Bossen | 340/146.1 AL |
| 3,634,821 | 1/1972 | Bossen et al. | 340/146.1 AL |

*Primary Examiner*—Charles E. Atkinson
*Attorney*—Hanifin & Jancin and Harold H. Sweeney, Jr.

[57] ABSTRACT

A cyclic code is encoded for double error correction in accordance with the following parity check matrix:

$$H=\begin{bmatrix}\alpha^1\,\alpha^2\ \ldots\ \alpha^i\ \ldots\ \alpha^n \\ (\alpha^3)^1(\alpha^3)^2\ \ldots\ (\alpha^3)^i\ \ldots\ (\alpha^3)^n\end{bmatrix}$$

where the code length $n$ is given by $2^m-1$ and $\alpha$ is a primitive element of $GF(2^m)$ represented by a binary column vector. Decoding of the coded message requires establishing a one to one correspondence between $n^2+n/2$ distinct error patterns and the corresponding syndromes. The $n^2+n/2$ distinct syndromes are mapped into $n+1/2$ *fixed syndromes by an arithmetic operation as follows:*

The syndrome is obtained in two parts for an error in each of digit positions $i$ and $j$ given by:

$$S=\begin{bmatrix}S_1\\S_3\end{bmatrix}=\begin{bmatrix}\alpha^i\oplus\alpha^j\\ \alpha^{3i}\oplus\alpha^{3j}\end{bmatrix}=\begin{bmatrix}\alpha^p\\ \alpha^q\end{bmatrix}$$

This syndrome is mapped into:

$$S'=\begin{bmatrix}S'_1\\S'_3\end{bmatrix}=\begin{bmatrix}\alpha^0\\ \alpha^{q-3p}\end{bmatrix}=\begin{bmatrix}\alpha^{i-p}\oplus\alpha^{j-p}\\ \alpha^{3(i-p)}\oplus\alpha^{3(j-p)}\end{bmatrix}$$

There are only $n+1/2$ distinct values of S′ to cover all possible single and double errors. The error positions resulting from the corresponding S′ are then mapped into actual error locations $i$ and $j$.

12 Claims, 10 Drawing Figures

INVENTORS
SE J. HONG
ARVIND M. PATEL

BY Harold H. Sweeney Jr.
ATTORNEY

CHECK BITS / SYNDROME GENERATION

CODEWORD W = [C(1), C(2),---,C(8)/J(1), J(2),---,J(7)]
1 2 ---- 8 9 10 ---- 15

Patented Jan. 30, 1973 3,714,629

8 Sheets-Sheet 3

DOUBLE ERROR CORRECTING METHOD AND SYSTEM

BACKGROUND OF THE INVENTION

The invention relates to a decoding system and method for correcting two errors in a specially encoded message and more particularly, to a decoding arrangement wherein the syndromes are identified by binary numbers and the subsequent operations are carried out in binary arithmetic form.

The invention is concerned with a method and an arrangement for the correction of a pair of errors occurring in cyclic codes falling into the BCH (Bose-Chaudhuri) code classification. These codes, containing binary data, are well known for their minimum redundancy (quasi-perfect) and cyclic structure. The invention is particularly intended for use in systems wherein the information to be transmitted is encoded using a special form of the H matrix. The H matrix or parity check matrix possesses the cyclic property in two parts as follows:

$$H=\left[\frac{\alpha^1\ \alpha^2\ .\ .\ .\ \alpha^i\ .\ .\ .\ \alpha^n}{(\alpha^3)^1(\alpha^3)^2\ .\ .\ .\ (\alpha^3)^i\ .\ .\ .\ (\alpha^3)^n}\right]$$

where the code length $n$ is given by $2^m-1$ and $\alpha$ is a primitive element of GF $(2^m)$ represented by a binary column vector. The matrix is partitioned into two submatrices from which a further specialized matrix is generated by means of which the parity tree circuit is determined to obtain the check bits. The actual message which is transmitted is represented by the check bit vector and the information bit vector.

With a code length $n$, there are $(n^2+n)/2$ different possible error patterns of one or two errors. The hardware required to recognize the syndromes of the errors and associate them with the corresponding error patterns is enormous for any useable value of $n$. The shift register method of implementation as shown in U.S. Pat. application Ser. No. 075,823, filed Sept. 28, 1970, uses the cyclic property of the code in order to attain savings in hardware. It requires, however, as many as $n$ shifting operations for trapping one of the errors. Benerji, R. B., "A Decoding Procedure For Double Error Correcting Bose-Ray-Chaudhuri Codes," IRE Proc., Page 1,585, Vol. 49, No. 10, 1961, discloses an encoding and decoding arrangement utilizing a shift register wherein the above-noted form of the H matrix is utilized. Benerji uses an algebraic mapping that requires several algebraic manipulations in the Galois Field. The hardware realization of these algebraic manipulations requires either many shift register operations or large table lookup operations.

It is the main object of the present invention to provide a fast double error correction of errors appearing in binary code words.

It is a further object of the present invention to provide a double error correction system for errors in binary code words in which the large class of double error syndrome vectors is mapped into a much smaller subclass of basic syndromes.

It is another object of the present invention to provide a double error correction system for errors in a binary word in which the basic syndromes are related to their respective error patterns.

It is a further object of the present invention to provide a double error correction system for errors in a binary word in which the actual error pattern is obtained from the error pattern of a basic syndrome and a stored parameter.

It is yet a further object of the present invention to provide a double error correcting decoding system in which steering logic or counting operations are not required.

SUMMARY OF THE INVENTION

The invention uses a two-error correcting BCH code with the following parity check matrix:

$$H=\left[\frac{\alpha^1\ \alpha^2\ .\ .\ .\ \alpha^i\ .\ .\ .\ \alpha^n}{(\alpha^3)^1(\alpha^3)^2\ .\ .\ .\ (\alpha^3)^i\ .\ .\ .\ (\alpha^3)^n}\right]$$

where the code length $n$ is given by $2^m-1$ and $\alpha$ is a primitive element of GF $(2^m)$ represented by a binary column vector. The decoding of this code requires establishing a one-to-one correspondence between the $n^2+n/2$ distinct error patterns and the corresponding syndromes. This is done by means of a technique called "syndrome trapping" in which the $n^2+n/2$ distinct syndromes are mapped into $n+1/2$ fixed syndromes by an arithmetic operation as follows:

The syndrome for errors in digit positions $i$ and $j$ is given by:

$$S=\begin{bmatrix}S_1\\S_3\end{bmatrix}=\begin{bmatrix}\alpha^i\oplus\alpha^j\\\alpha^{3i}\oplus\alpha^{3j}\end{bmatrix}=\begin{bmatrix}\alpha^p\\\alpha^q\end{bmatrix}$$

This syndrome is mapped or shifted into:

$$S'=\begin{bmatrix}S'_1\\S'_3\end{bmatrix}=\begin{bmatrix}\alpha^0\\\alpha^{q-3p}\end{bmatrix}=\begin{bmatrix}\alpha^{i-p}\oplus\alpha^{j-p}\\\alpha^{3(i-p)}\oplus\alpha^{3(j-p)}\end{bmatrix}$$

There are only $n+1/2$ distinct values of S' to cover all possible single and double errors. Error positions corresponding to the resulting S' are then mapped into error locations $i$ and $j$. The actual decoding steps can be summarized as follows:

Step 1. From the received information, obtain the syndrome S in the form:

$$S=\begin{bmatrix}S_1\\S_3\end{bmatrix}=\begin{bmatrix}\alpha^p\\\alpha^q\end{bmatrix}$$

Step 2. Identify $p$ and $q$.

Step 3. Encode $p$ $(-3p)$ and $q$ as $m$ bit binary numbers.

Step 4. Obtain $k=q+(-3p)$.

Step 5. From the table, find $i'$ and $j'$ corresponding to $k$.

Step 6. Obtain $i=p+i'$ and $j=p+j'$.

Step 7. Decode $i$ and $j$ into error pointers.

The foregoing and other objects, features and advantages of the invention will be apparent from the following more particular description of a preferred embodiment of the invention as illustrated in the accompanying drawings.

THEORETICAL DESCRIPTION OF THE INVENTION

Figure 1:
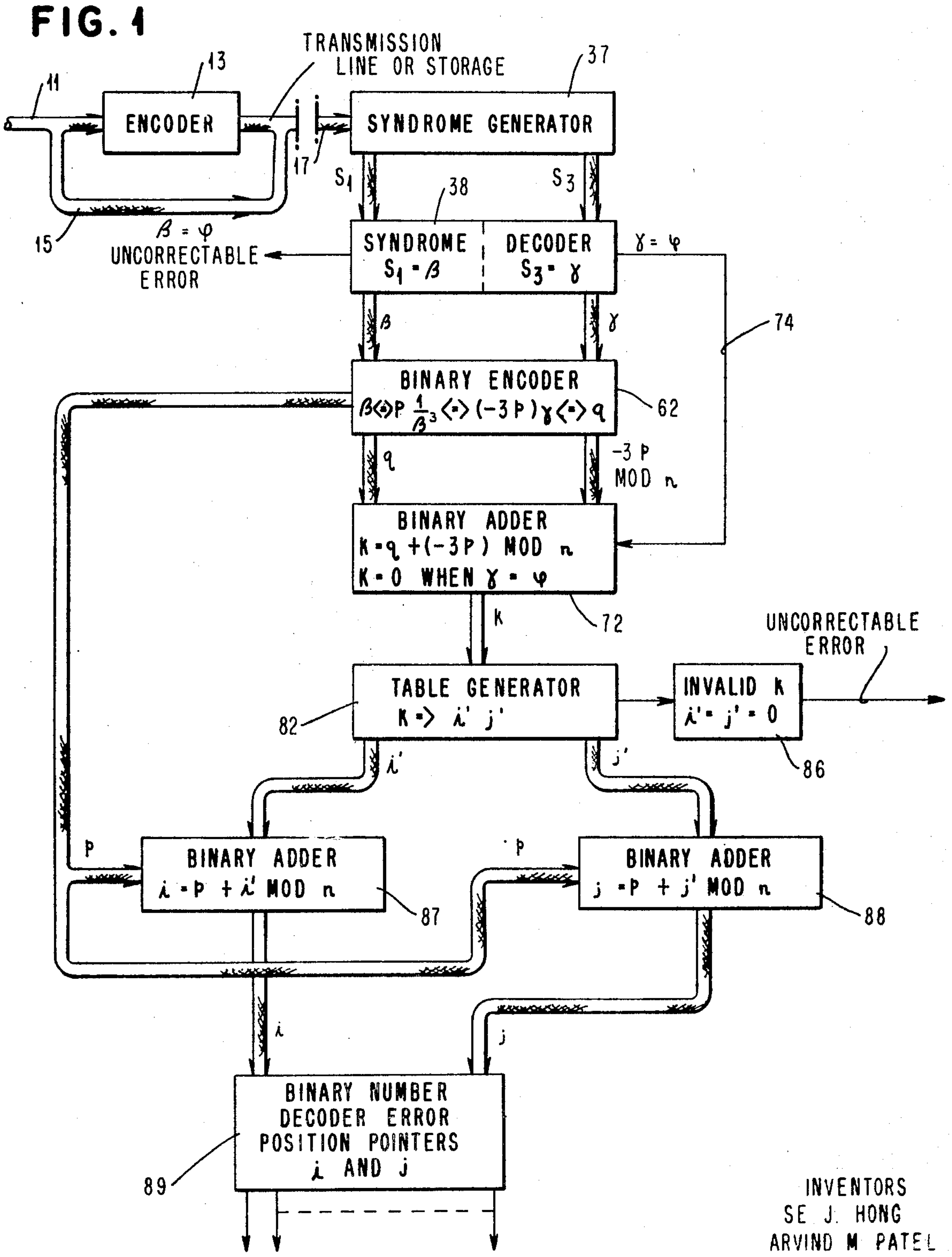
FIG. 1 is a schematic diagram showing the various blocks of the invention and identifying the various functions performed thereby.

The binary information is encoded into a code word before transmission by attaching a fixed number of check bits computed according to the parity checking rules described by the parity check matrix. The parity check matrix possesses the cyclic property of the code in two parts as follows:

$$H=\begin{bmatrix} \alpha^1\alpha^2\alpha^i & \ldots & \alpha^n \\ \alpha^3\alpha^6(\alpha^3)^i & \ldots & (\alpha^3)^n \end{bmatrix} \qquad (1)$$

where $\alpha$ is a primitive element of Galois Field ($GF(2^m)$) and the field element $\alpha^i$ is represented by a binary column vector of length $m$ and $n = 2^m-1$.

The first $r = 2m$ digits of the code word are assigned as check digits and the matrix is accordingly partitioned into sub-matrices P and A, where P contains the first $2m$ columns and A contains the rest of the $n-2m$ columns. Let J represent the column vector of $n-2m$ information digits and let C denote the column vector of corresponding $2m$ check digits, we arrive at the following parity check equation:

$$PC\oplus AJ=0 \qquad (2)$$

The symbol $\oplus$ denotes mod 2 sum of binary vectors. It can be shown that the matrix P is invertible. Using $P^{-1}$, from Equation (2), we get the following equation for check bit generation:

$$C=BJ \qquad (3)$$

where:

$$B=P^{-1}A \qquad (4)$$

The code word W to be transmitted is simply formed by concatenating the vectors C and J as follows:

$$W=\begin{bmatrix} C \\ J \end{bmatrix}$$

At the receiver, the received message, denoted by $W$, may contain errors. In order to determine the location of the errors, the syndrome is determined. In order to generate this syndrome, let $C$ denote the received check sequence and let $J$ denote the received information sequence. The syndrome $S$ is given by:

$$S=PC\oplus AJ=P(C\oplus P^{-1}AJ)=P(C\oplus BJ)=PS' \qquad (5)$$

where:

$$S'=C\oplus BJ \qquad (6)$$

The actual parity circuit is derived according to the parity check matrix $H' = [I,B]$, where $I$ is a $2m \times 2m$ identity matrix and an additional circuit corresponding to the results of multiplying by matrix P to transform the syndrome S' into S.

If the syndrome vector S (and hence S') is zero, the received message is a legal code word and thus it is assumed that it is error free. A non-zero syndrome is processed further for error correction. The syndrome S, corresponding to a received message sequence, is a binary vector of length $2m$. Hence, any syndrome S can be identified using the elements from GF ($2^m$) in the following manner:

$$S=\begin{bmatrix} S_1 \\ S_3 \end{bmatrix}=\begin{bmatrix} \beta \\ \gamma \end{bmatrix} \qquad (7)$$

where $\beta$ and $\gamma$ are elements of GF ($2^m$). When $\beta=\gamma=\phi$ ($\phi$ denotes the zero element of the field), the received sequence is a code word and is assumed to be error free. It can be seen that $\beta=\phi$ and $\gamma \neq \phi$ occurs only when there are more than two errors. Assuming that an error has occurred in each of positions $i$ and $j$ ($i, j=1,2,3,\ldots n$), the syndrome S is obtained by the sum (mod 2) of the corresponding columns of the parity check matrix, that is:

$$S_1=\alpha^i\oplus\alpha^j=\beta=\alpha^p \qquad (8)$$

$$S_3=\alpha^{3i}\oplus\alpha^{3j}=\gamma=\begin{cases}\alpha^q \text{ if } 3i\neq 3j \pmod n\\ \phi \text{ if } 3i=3j \pmod n\end{cases} \qquad (9)$$

Consider the syndrome S' given by:

$$S'=\begin{bmatrix} \alpha^0 \\ \theta \end{bmatrix} \qquad (10)$$

where:

$$\theta=\frac{\gamma}{\beta^3}\begin{cases}\alpha^{q-3p} \text{ if } 3i\neq 3j \pmod n\\ \theta \text{ if } 3i=3j \pmod n\end{cases} \qquad (11)$$

In the two error assumption case, the syndrome $$S=\begin{bmatrix}\beta\\ \gamma\end{bmatrix}$$

corresponds to errors in positions $i$ and $j$ if and only if the syndrome $$S'=\begin{bmatrix}\alpha^0\\ \theta\end{bmatrix}$$

which corresponds to errors in position $i'$ and $j'$, where $i' = (i-p) \bmod n$ and $j' = (j-p) \bmod n$. Thus, the number of distinct values of $\theta$ for all the two-error patterns is $n-1/2$. This can be clarified somewhat when it is realized that a double error in position $i$ and $j$ generates the syndrome $$S=\begin{bmatrix}\beta\\ \gamma\end{bmatrix}$$

, where $\beta$ and $\gamma$ are given by Equations (8) and (9). However, Equations (8) and (9) hold, if and only if:

$$\alpha^0=\alpha^{i-p}\oplus\alpha^{j-p}=\alpha^{i'}\oplus\ \alpha^{j'} \qquad (12)$$

and:

$$\theta=\alpha^{3i-3p}\oplus\alpha^{3j-3p}=\alpha^{3i'}\oplus\ \alpha^{3j'} \qquad (13)$$

where $i' = (i-p) \bmod n$ and $j' = (j-p) \bmod n$. Equations (12) and (13) characterize the syndrome for an error in each of positions $i'$ and $j'$. Conversely, each double error syndrome, in which $\beta=\alpha^0$, characterize $n$ different double error syndromes with $\beta=\alpha^p$ where $p \epsilon \{1,2, . . , n\}$. Hence, in view of the uniqueness of the double-error syndromes, there are $n(n-1)/2$ distinct double-error syndromes, and $(n-1)/2$ distinct values of $\theta$. Thus, the strategy is to map the double error syndromes S into a subclass of double-error syndromes (S') in which $\beta=\alpha^0$. It is not necessary that $\beta=\alpha^0$, in fact, any $\alpha^e$ for a fixed $e$ may be chosen as the value of $\beta$ in the trapped syndrome. The important feature of the syndrome trapping technique is that the mapping of the double-error syndromes and the corresponding error positions can be realized by addition of integers (mod $n$), which characterize the binary sequences as the powers of the primitive elements. For example, the mapping $\theta=\gamma/\beta^3$ is realized by the operation $k=q+(-3p) \bmod n$, where $\beta=\alpha^p$, $\gamma=\alpha^q$ and $\theta=\alpha^k$. The parameter $k$ is related to the error positions $i'$ and $j'$ using a relatively small table. The actual error positions $i$ and $j$ are obtained by the operation $i=(i'+p) \bmod n$ and $j=(j'+p) \bmod n$.

It should be noted that $S'=0$ if, and only if, $S=\mathbf{0}$, which is the no error indication. If an error exists, the syndrome $$S=\begin{bmatrix}\beta\\ \gamma\end{bmatrix}$$

is processed further for single or double error correction. It should be noted that single errors can be considered as a special case of double errors, in which $i=j$ with an additional value of $\theta=\alpha^0$. However, since the probability of occurrence of a single error is much higher than that of double errors, it may be desirable to correct single errors directly. This can be done by recognizing the fact that for single errors $\gamma=\beta^3$. The error is then in position $p$, where $\beta=\alpha^p$.

For the double error correction situation, $\beta$ and $\gamma$ are represented by $m$ bit binary numbers $p$ and $q$ (mod $n$)

where $\beta=\alpha^p$ and $\gamma=\alpha^q$. If $\beta=\phi$, then three or more digit positions are in error and hence, uncorrectable. When $\gamma=\phi$, it is treated as a special case with an undefined value of $q$ (for example, $q=0$). The transformation $\theta=\gamma/\beta^3=\alpha^k$ is obtained using an $m$ bit adder with end-around carry. The adding operation is $k=q+(-3p) \bmod n$. The adder output $k$ is forced to be 0 when $\gamma=\phi$, which corresponds to the case $\theta=\phi$. Note that the adder output $k$ is non-zero in all other cases; in particular, $k$ is equal to $n$ in the case of a single error when $q=3p$. A hard wired table, called a $k$ table, maps $k$ into the corresponding double error represented by the $m$ bit binary numbers $i'$ and $j'$. The actual error positions $i$ and $j$ are then determined using $m$ bit adders with end-around carry. All the numbers used are residues modulo $n$. The multiples of $n$, however, when reduced modulo $n$, are represented by the number $n$ rather than the number 0. This facilitates the practical implementation of the modulo $n$ operation in the adder with an end-around carry.

The decoding steps for the system can be summarized in the following manner:

Step 1. Obtain syndrome S as previously described.

Step 2. Break S into $$S=\begin{bmatrix}S_1\\ S_3\end{bmatrix}$$

and decode $S_1$ and $S_3$ as field elements $\beta$ and $\gamma$, respectively. If $\beta=\phi$, there is an uncorrectable error. If $\gamma=\beta^3$, there is a single error.

Step 3. Encode $\beta$, $1/\beta^3$, and $\gamma$ by $m$ bit binary numbers representing $p$ $(-3p) \bmod n$ and $q$ respectively, where:

$\beta=\alpha^p$ and $\gamma=\alpha^q$ $\beta \neq \phi \gamma \neq \phi$

Step 4. Obtain $k=q+(-3p) \bmod n$. Assign $k=\mathbf{O}$ if $\gamma=\phi$.

Step 5. From the $k$ table, obtain i' and j' corresponding to $k$. $i'$ and $j'$ are $m$ bit binary numbers. $k=n$ corresponds to the single error with $i'=j'=n$. $k=0$ corresponds to the double error with $\gamma/\beta^3=\phi$.

Step 6. Obtain $i=i'+p \bmod n$; $j=j'+p \bmod n$.

Step 7. Decode the binary numbers $i$ and $j$ into error position pointers.

DESCRIPTION OF AN EMBODIMENT OF THE INVENTION

Referring to FIG. 1, the message to be encoded is received via cable 11 from a transmission or utilization device such as a part of a data handling system. The information message is fed into the encoder 13 which adds check bits to the message. The information message bypasses the encoder via cable 15. The check bits are added at the junction of cable 15 and transmission line 17. Typically, the check bits are carried along with the information bits for indicating the occurrence and location of errors in both the information bits and the check bits. In the well known Hamming Code (see for example, Reissue U.S. Pat. No. 23,601, "Error-Detecting and Correcting System," Richard W. Hamming et al., assigned to Bell Telephone Laboratories) each check bit and preselected information bit form a code group, the value of each check bit being determined by the value of the information bits in its code group. Therefore, any change in either an information bit or a check bit during transmission will be identifiable at the receiving end. A (15,7) code has been selected as an illustrative embodiment. Thus, there are eight check bits required to be added to a seven bit message making the overall length $n = 15$. In general, $2m$ check bits are sufficient for an overall length of $2^m-1$. It should be appreciated that the longer length codes are more efficient from the viewpoint of number of check bits required versus number of information bits. Also, the savings in hardware improves as the code length increases.

The encoder 13 is designed in accordance with a preselected matrix:

$$H=\begin{bmatrix} \alpha^1\ \alpha^2\ .\ .\ .\ \alpha^i\ .\ .\ .\ \alpha^n \\ \hline (\alpha^3)^1(\alpha^3)^2\ .\ .\ .\ (\alpha^3)^i\ .\ .\ .\ (\alpha^3)^n \end{bmatrix}$$

The code generated using a matrix of this form is a two-error correcting BCH code where the code length $n$ is given by $2^m-1$ and $\alpha$ is a primitive element of $GF(2^m)$ represented by a binary column vector. The actual binary form of the parity check matrix can be obtained using the field elements of $GF(2^4)$ generated by the primitive polynomial $1 + X + X^4$ for the (15,7) code example. The first four bits of column $i$ ($i = 1,2,\ldots,n$) is obtained by dividing $X^i$ by the primitive polynomial $1 + X + X^4$ to obtain the remainder. The coefficients of the remainder being the 1's and 0's of the matrix. The bottom half of the matrix is formed in accordance with the bottom line of the matrix which indicates the elements raised to the third power. That is, each column vector in the bottom half of the matrix corresponds to the 3rd, 6th, 9th, etc. column vector of the top half. The H matrix in its binary form is as follows $$H=\left[\begin{array}{cccccccc|ccccccc} 1&0&0&0&1&0&0&1&1&0&1&0&1&1&1\\ 0&1&0&0&1&1&0&1&0&1&1&1&1&0&0\\ 0&0&1&0&0&1&1&0&1&0&1&1&1&1&0\\ 0&0&0&1&0&0&1&1&0&1&0&1&1&1&1\\ 1&0&0&0&1&1&0&0&0&1&1&0&0&0&1\\ 0&0&0&1&1&0&0&0&1&1&0&0&0&1&1\\ 0&0&1&0&1&0&0&1&0&1&0&0&1&0&1\\ 0&1&1&1&1&0&1&1&1&1&0&1&1&1&1 \end{array}\right] \quad (15)$$

1 2 3 4 5 6 7 8 9 10 11 12 13 14 15

(columns 1–8: P; columns 9–15: A)

Check bit generating circuits are constructed by allowing each information bit "1" in the information bit matrix to represent one input leg of an EXCLUSIve OR circuit and each check bit "1" to represent an output. In our particular example, the check bit generator of the encoder is not derived directly from the H matrix (15) but is derived from a matrix B as follows:

$$B=\begin{bmatrix} 1&1&0&1&0&0&0\\ 0&1&1&0&1&0&0\\ 0&0&1&1&0&1&0\\ 0&0&0&1&1&0&1\\ 1&1&0&1&1&1&0\\ 0&1&1&0&1&1&1\\ 1&1&1&0&0&1&1\\ 1&0&1&0&0&0&1 \end{bmatrix}$$

9 10 11 12 13 14 15

Figure 2:
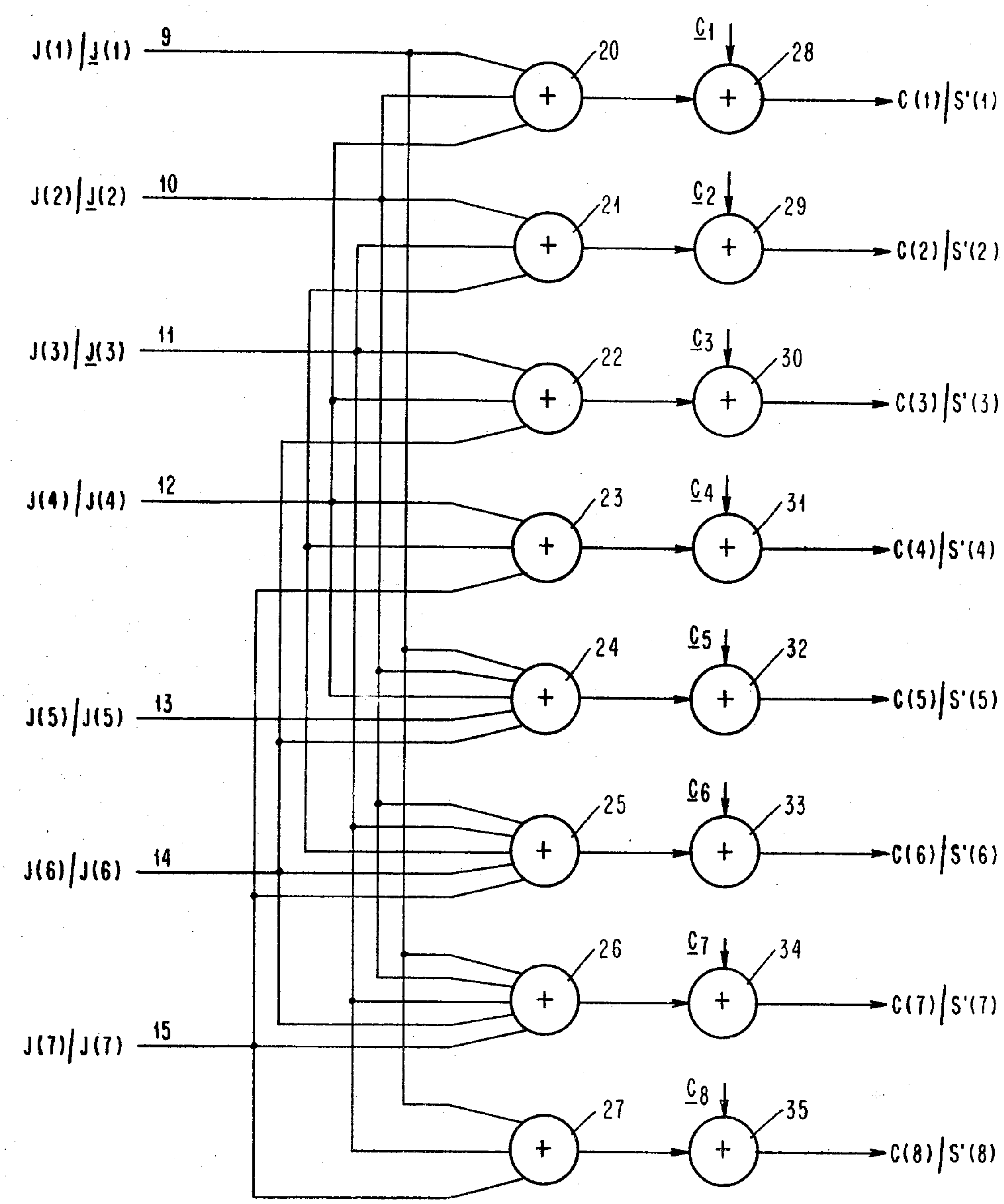
FIG. 2 is a logic diagram of the encoder shown in FIG. 1.
Figure 3:
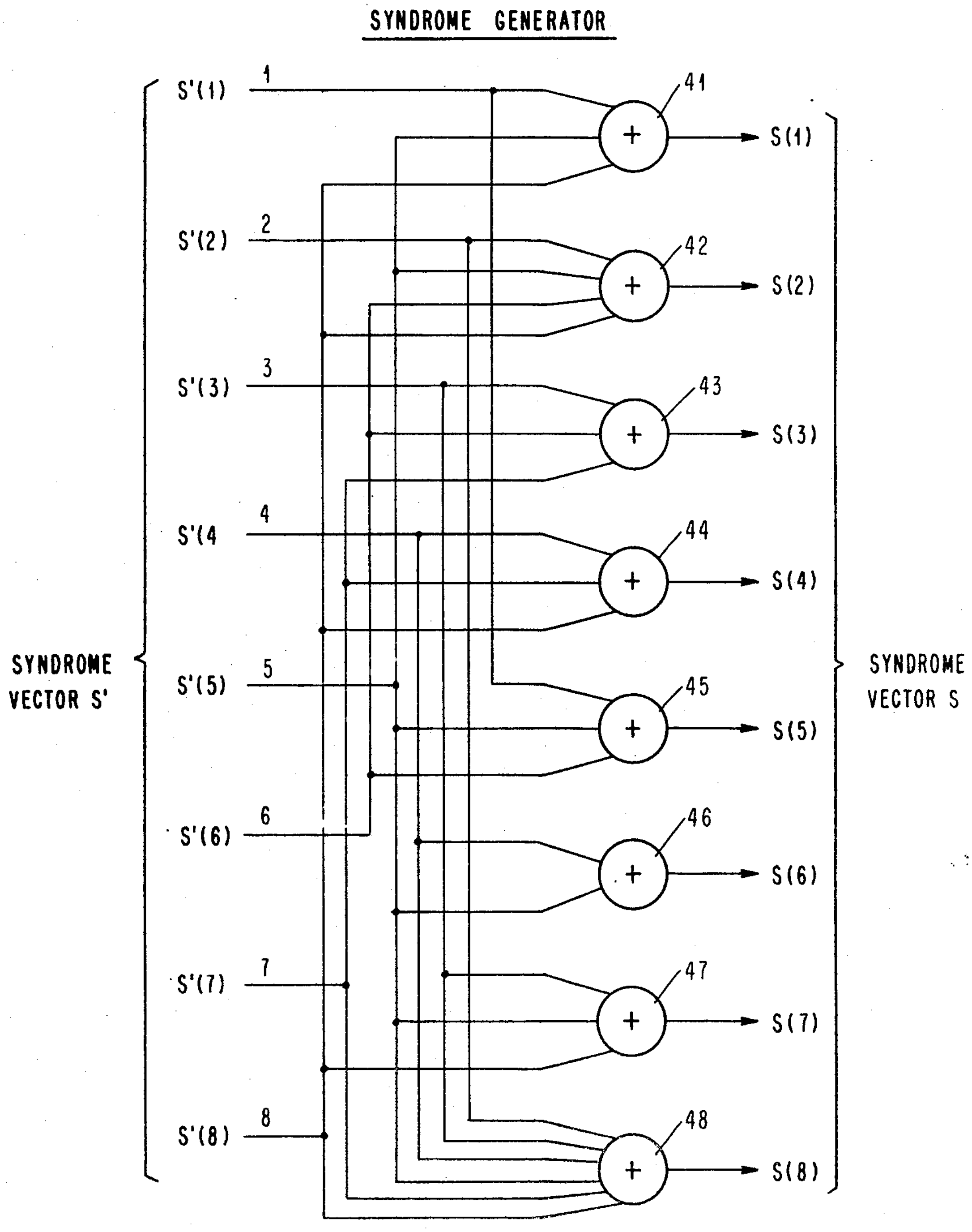
FIG. 3 is a schematic logic diagram showing part of the syndrome generator of FIG. 1.
Figure 4A:
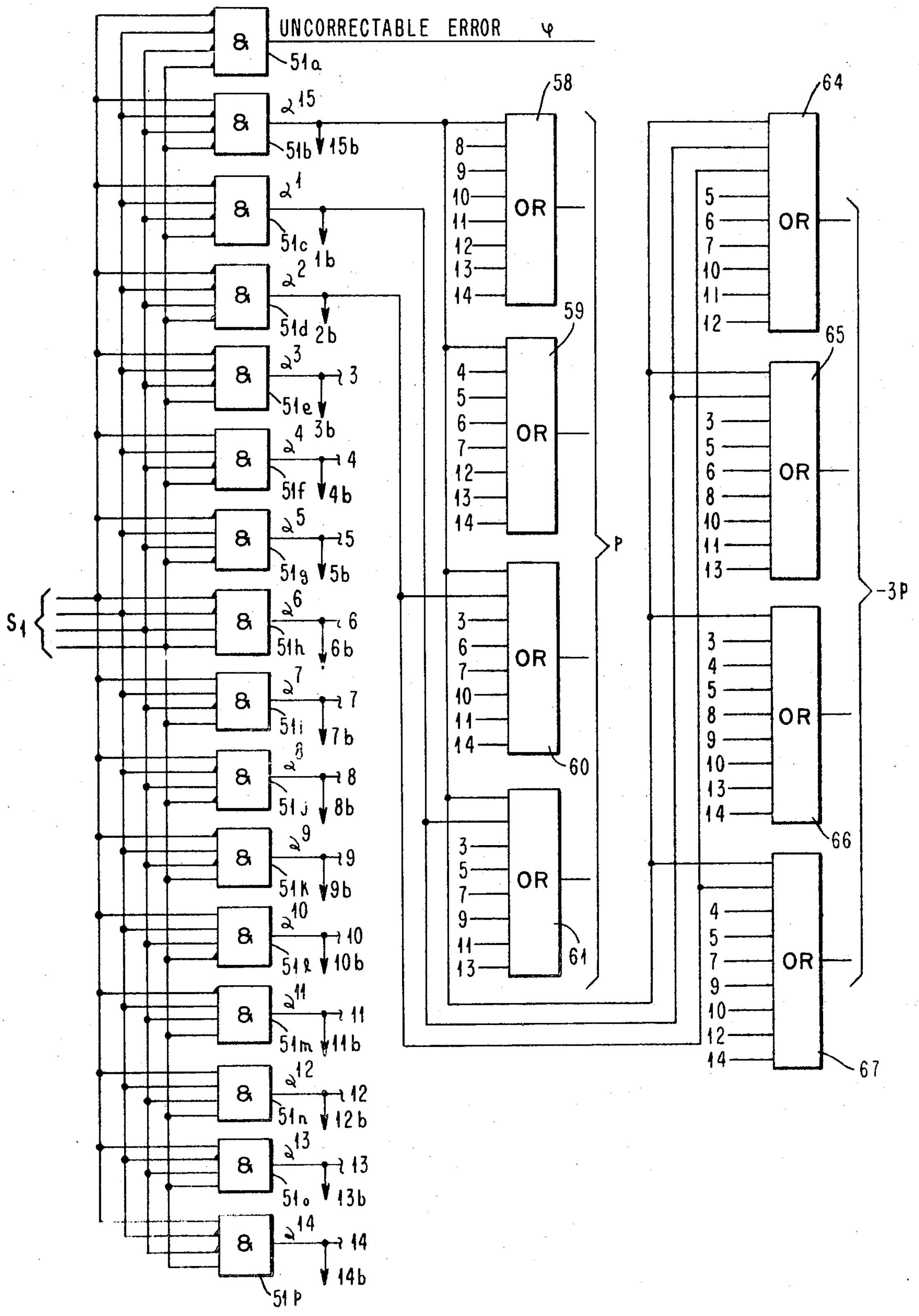
FIG. 4A is a schematic logic diagram showing a portion of the syndrome decoder and binary encoder for generating $p$ and $-3p$.

Matrix B is generated by partitioning the H matrix into a P and A section as shown in (15). The P portion is made 8 bits long and represents the check bit section and the remaining section A of 7 bits represents the information matrix. From these sub-matrices P and A, the matrix B is formed. $B = P^{-1}A$, which is derived from Equations (2) and (3) in the previous section covering theory. The parity check tree or check bit generating circuit is shown in FIG. 2 and is constructed in accordance with the B matrix. There are eight modulo 2 adder circuits 20 through 27, each corresponds to a code group (row) in the matrix B. The inputs thereto are determined by the 1 bits in the matrix. For example, the J(1), J(2) and J(4) information bits represented by 9, 10 and 12 columns in the B matrix, respectively, are connected as inputs to the modulo 2 adder circuit 20. In other words, the information represented by 1's in the rows of the matrix are EXCLUSIVE OR'ed together to produce an output which represents the check bit for that code group. Thus, the outputs of the various code groups are check bits C(1) through C(8). The parity tree of FIG. 2 was generated from the B matrix rather than the H matrix for generating the check bits. The same parity tree could also be used for generating the syndrome. As can be seen from FIG. 2, the same information bits J(1) through J(7) are utilized as inputs but are underlined indicating that they are received information. Likewise, EXCLUSIVE OR circuits 28–35 are added, one to each of the outputs of the EXCLUSIVE OR circuits 20–27. The other input to each EXCLUSIVE OR circuit 28–35 is the received check bit C(1) through C(8), respectively. The output when the circuit is used as a syndrome generator is S' (1) – S' (8). This syndrome is not in the desired form so that it is necessary to use the syndrome transformation circuit of FIG. 3 to put the syndrome in the desired form. The encoded message, that is, the message with the check bits added to the information bits in accordance with the parity check matrix of the encoder 13 is transmitted via the transmission line 17. The information in transmittal may have errors introduced therein. In data handling apparatus such as a computer, the information could be stored in memory where such errors might be introduced. Thus, it is clear that the message received at syndrome generator 37, after having been stored or transmitted, may very well have errors which must be located and corrected. In the syndrome generator 37, the syndrome S' (1)–S' (8) is generated and the actual syndrome S(1) – S(8) is generated using the syndrome transformation parity tree which is constructed in accordance with the P matrix. The inputs to the syndrome transformation tree of FIG. 3 consist of the S' (1) – S' (8) outputs of the previously described syndrome generator. The S' (1) – S' (8) vector is connected to the modulo 2 adder circuits 41–48 as shown. The input connections being made in accordance with the 1 bits in the P transformation matrix. The syndrome vector output S(1) - S(8) contains information with respect to the parity of the received information. For example, if the parity of the received information is correct, that is, no errors have been introduced, the syndrome vector contains all zeroes and, therefore, further error correction is not required. At the output of the syndrome generator 37, the syndrome vector S is broken into two smaller syndrome vectors $S_1$ and $S_3$, each containing four syndrome bits. The syndromes $S_1$ and $S_3$ are decoded into $S_1 = \beta$ and $S_3 = \gamma$ in syndrome decoder 38. Syndrome decoder 38 includes the AND circuits shown in FIGS. 4A and 4B, respectively. The four-bit vector syndrome $S_1$ is shown in FIG. 4A as being fed into the 16 AND circuits 51*a*–51*p*. The output of each AND circuit is identified as $\alpha$ raised to a particular power. The values of $S_1$ and the corresponding $\alpha^p$ values are shown in Table I as follows:

| Binary sequence, $S_1$ or $S_3$ | | | | Field element, $\beta$ or $\gamma$ | Binary number, p or q | | | | Binary number, (−3p) (mod n) | | | |
|---|---|---|---|---|---|---|---|---|---|---|---|---|
| 0 | 0 | 0 | 0 | $\varphi$ | 0 | 0 | 0 | 0 | 0 | 0 | 0 | 0 |
| 1 | 0 | 0 | 0 | $\alpha^{15}$ | 1 | 1 | 1 | 1 | 1 | 1 | 1 | 1 |
| 0 | 1 | 0 | 0 | $\alpha^1$ | 0 | 0 | 0 | 1 | 1 | 1 | 0 | 0 |
| 0 | 0 | 1 | 0 | $\alpha^2$ | 0 | 0 | 1 | 0 | 1 | 0 | 0 | 1 |
| 0 | 0 | 0 | 1 | $\alpha^3$ | 0 | 0 | 1 | 1 | 0 | 1 | 1 | 0 |
| 1 | 1 | 0 | 0 | $\alpha^4$ | 0 | 1 | 0 | 0 | 0 | 0 | 1 | 1 |
| 0 | 1 | 1 | 0 | $\alpha^5$ | 0 | 1 | 0 | 1 | 1 | 1 | 1 | 1 |
| 0 | 0 | 1 | 1 | $\alpha^6$ | 0 | 1 | 1 | 0 | 1 | 1 | 0 | 0 |
| 1 | 1 | 0 | 1 | $\alpha^7$ | 0 | 1 | 1 | 1 | 1 | 0 | 0 | 1 |
| 1 | 0 | 1 | 0 | $\alpha^8$ | 1 | 0 | 0 | 0 | 0 | 1 | 1 | 0 |
| 0 | 1 | 0 | 1 | $\alpha^9$ | 1 | 0 | 0 | 1 | 0 | 0 | 1 | 1 |
| 1 | 1 | 1 | 0 | $\alpha^{10}$ | 1 | 0 | 1 | 0 | 1 | 1 | 1 | 1 |
| 0 | 1 | 1 | 1 | $\alpha^{11}$ | 1 | 0 | 1 | 1 | 1 | 1 | 0 | 0 |
| 1 | 1 | 1 | 1 | $\alpha^{12}$ | 1 | 1 | 0 | 0 | 1 | 0 | 0 | 1 |
| 1 | 0 | 1 | 1 | $\alpha^{13}$ | 1 | 1 | 0 | 1 | 0 | 1 | 1 | 0 |
| 1 | 0 | 0 | 1 | $\alpha^{14}$ | 1 | 1 | 1 | 0 | 0 | 0 | 1 | 1 |

TABLE I

Figure 4B:
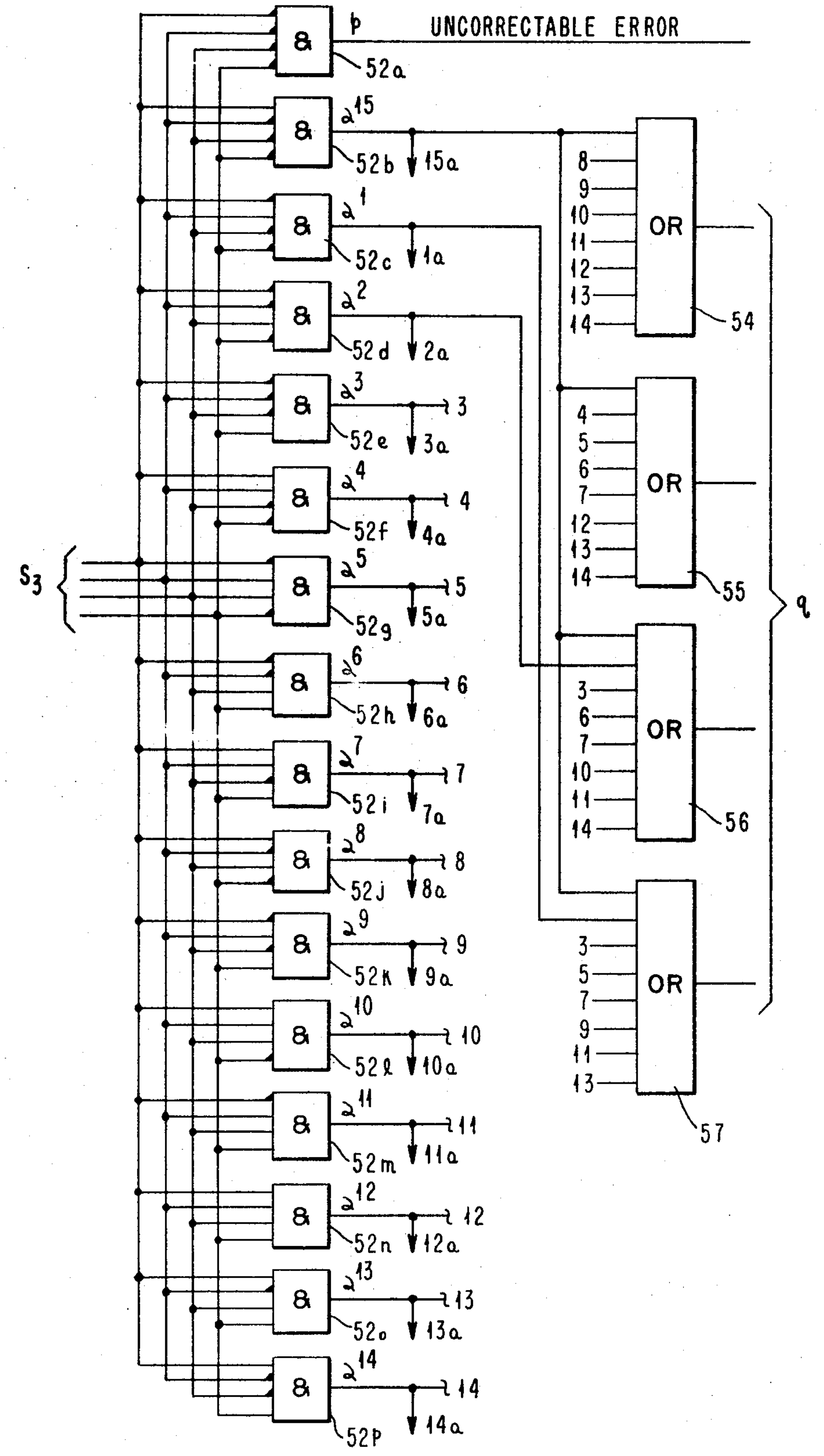
FIG. 4B shows a schematic logic diagram of a portion of the syndrome decoder and binary encoder for obtaining the value of $q$.

Likewise, the $S_3 = \gamma$ syndrome inputs are decoded utilizing 16 AND circuits 52*a*–52*p* as shown in FIG. 4B. The various $S_3$ inputs and the corresponding $\alpha^q$ values are shown in Table I. Thus, the AND inputs are arranged by NOTing the appropriate lines so that successive AND circuits will respond to the successive $S_3$ values shown in Table I. The corresponding outputs of the AND circuits are identified by the appropriate $\alpha^q$ value in accordance with the Table. The outputs of the AND circuits are now put in binary form by making the appropriate connections to the four OR circuits 54–57. The *q* output obtained is a binary number representation equivalent to the exponent of the $\alpha$. For example, the output of AND circuit 52*e*, which is identified as $\alpha^3$, is connected to OR circuits 56 and 57, thereby producing as an output the binary number 0011 which is binary 3. It should be noted that the binary number is equivalent to the associated exponent of $\alpha$. This transformation or decoding is very important to the invention since the syndrome is now represented in a binary number form so that the following operations can be done in binary arithmetic rather than in the Galois Field. This considerably reduces the amount of mechanization and complication.

Referring again to FIG. 4A, the *p* parameter is likewise generated using four EXCLUSIVE OR circuits 58–61 connected to the respective AND outputs so that the *p* output is a binary number representation of the exponent of the $\alpha$ associated with the particular AND circuit. The binary numerical representation of *p* and *q* are shown in Table I. Also shown in Table I are the $-3p$ representations which are generated in the binary encoder 62. These $-3p$ outputs are generated from the four EXCLUSIVE OR circuits 64–67 shown in FIG. 4A. The AND circuits 51*a*–51*p* are connected to the four OR circuits 64–67 to generate $-3p$ in accordance with the $-3p$ binary numbers shown in Table I. For example, the output $\alpha^5$, from its corresponding AND circuit 51*g*, corresponds to the 1111 row in the binary number $-3p$ column of the Table. The AND circuit 51*g* output is connected to each of the four OR circuits 64–67 thus giving a four bit output representing the all 1 value (1111) of $-3p$. It will be appreciated in connection with FIG. 4A, that if $\beta = \phi$, we have an uncorrectable error as shown by the output of AND circuit 51*a*.

Figure 4C:
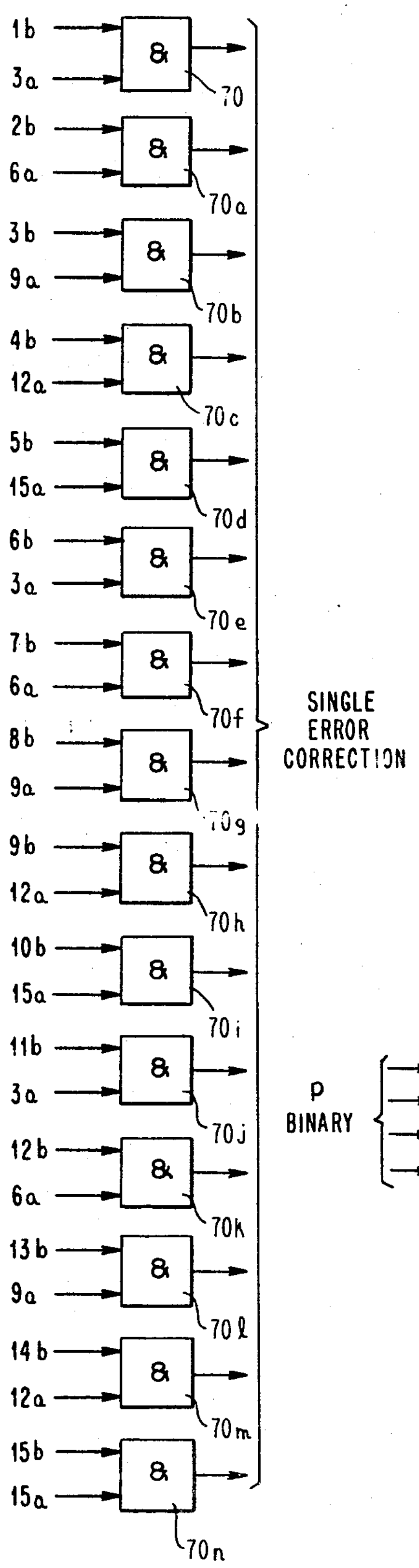
FIG. 4C is a schematic diagram showing the various connections to FIGS. 4A and 4B to obtain single error correction.
Figure 5:
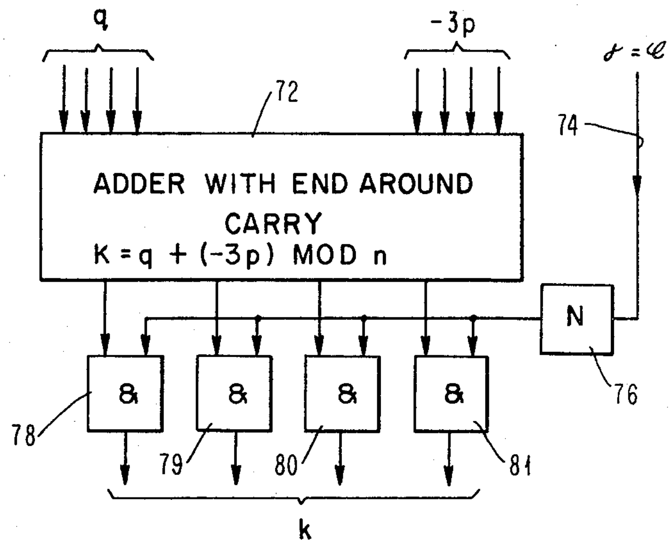
FIG. 5 shows a schematic diagram of an adder with end-around carry for obtaining the value $k$.

The binary encoder 62, consisting of the OR gate portions of FIGS. 4A and 4B for generating *p*, $-3p$ and *q*, also includes a single error correcting capability. Single error correction pointers are obtained when $\gamma = \beta^3$. Thus, AND gates 70–70*n* are connected to the respective outputs of the AND gates of FIGS. 4A and 4B. For example, the AND gate 70 of FIG. 4C is connected to the output 1*b* of AND gate 51*c* represented by $\alpha^1$, as shown in FIG. 4A, and the other input is connected to the output 3*a* shown at the output of AND gate 52*e* of FIG. 4B. Actually, $\beta$ and $\gamma = \beta^3$, represent the same column vector in the H matrix, therefore, representing an error in that digit position only. The four bits of binary vectors *q* and $-3p$, generated by the binary encoder 62, are fed as inputs to a binary adder 72 having end-around carry as shown in FIG. 5. The binary adder having end-around carry is well known. The details can be found in Residue Arithmetic And Its Applications to Computer Technology, N. S. Szabo and R. I. Tanaka, McGraw-Hill Book Company, 1967.

When $\gamma = \phi$, which is the zero element of the field elements, is generated in the syndrome decoder 38, an output is produced on line 74 which serves as an input to binary adder 72. The line 74 contains a NOT circuit 76 which inverts the input to a "0" value which forces an all "0" output for the AND circuits 78–81. The addition of the four bit binary vectors *q* and $-3p$ produces a value *k* which is represented by eight binary numbers of four digits each. The values of *k* are shown in Table II as follows:

| k | | | | | i′ | | | | j′ | | | |
|---|---|---|---|---|---|---|---|---|---|---|---|---|
| 1 | 0 | 1 | 0 | 10 | 0 | 0 | 0 | 1 | 0 | 1 | 0 | 0 |
| 0 | 1 | 0 | 1 | 5 | 0 | 0 | 1 | 0 | 1 | 0 | 0 | 0 |
| 1 | 0 | 0 | 0 | 8 | 0 | 0 | 1 | 1 | 1 | 1 | 1 | 0 |
| 0 | 0 | 0 | 0 | 0 | 0 | 1 | 0 | 1 | 1 | 0 | 1 | 0 |
| 0 | 0 | 0 | 1 | 1 | 0 | 1 | 1 | 0 | 1 | 1 | 0 | 1 |
| 0 | 1 | 0 | 0 | 4 | 0 | 1 | 1 | 1 | 1 | 0 | 0 | 1 |
| 0 | 0 | 1 | 1 | 3 | 1 | 0 | 1 | 1 | 1 | 1 | 0 | 0 |
| 1 | 1 | 1 | 1 | 15 | 1 | 1 | 1 | 1 | 1 | 1 | 1 | 1 |
| Any other | | | | Invalid | 0 | 0 | 0 | 0 | 0 | 0 | 0 | 0 |

TABLE II

The decimal equivalent of the binary number is given in Table II beside the $k$ for convenience. It should be appreciated that this binary addition function is an actual mapping of the syndrome into a smaller number of syndromes represented by $k$. In other words, the 15-digit or bit message has $n(n-1)/2$ double error combination possibilities and likewise, an equal number of syndromes are required. The $k$ table (Table II) reduces the number of syndromes to $n+1/2$ fixed syndromes by this simple arithmetic addition operation. The outputs $k$ from the binary adder 72 are fed to a table generator which generates values of $i'$ and $j'$ corresponding to the various $k$'s. These $i'$ and $j'$ values are also given in Table II.

Figure 7:
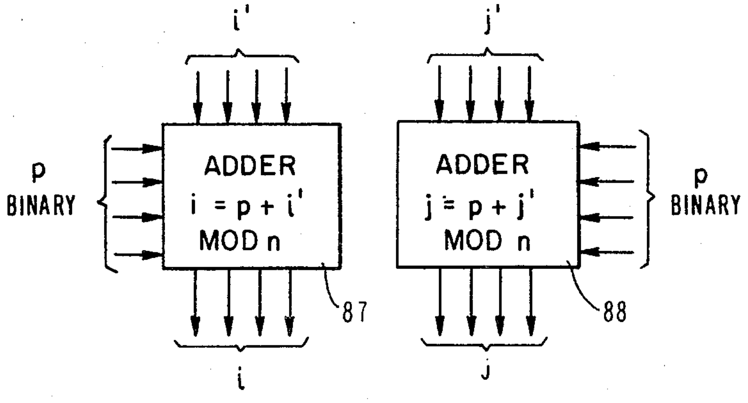
FIG. 7 is a block diagram of a pair of adders for obtaining the values $i$ and $j$.
Figure 6:
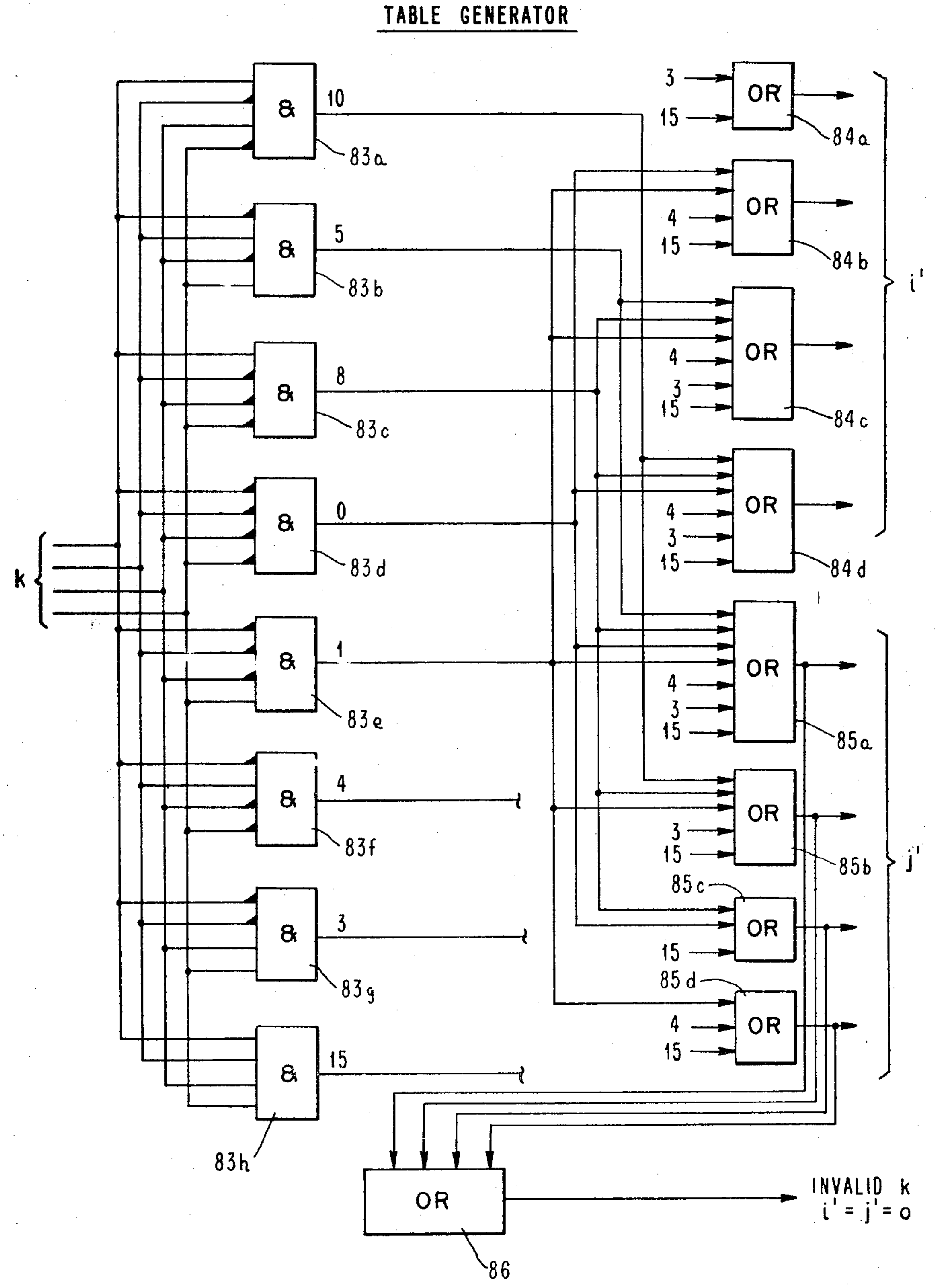
FIG. 6 is a schematic logic diagram of the table generator shown in FIG. 1.

The mechanization of Table II is shown in the table generator 82 of FIG. 6 where the four-bit input values of $k$ are connected to each of eight AND circuits 83*a*–83 in which the inputs are arranged so that one, and only one, AND circuit will respond to one of the $k$ inputs. The decimal value of $k$ is indicated at the output of the respective AND circuit. The outputs of the various AND circuits 83*a*–83*h* are connected to four OR gates 84*a*–84*d*, the connections of which determine the four-bit output corresponding to $i'$. Also, there are OR circuits 85*a*–85*d* connected to the eight AND circuits 83*a*–83, connected so as to produce a four-bit output $j'$ corresponding to the input connections. For example, the AND circuit 83*b*, represented at the output thereof by the decimal 5, is connected to OR circuit 84*c* giving a 0010 output which corresponds to $i'$ as shown in the table for $k = 5$. Likewise, a connection is made from AND circuit 83*b* to the OR circuit 85*a* in the second group of OR circuits 85*a*–85*d* whose outputs represent $j'$. The output will be (1000) representing the $j'$ value for $k = 5$. A four-way OR gate 86 has four inputs thereto, one connected to each of the outputs of each of the four OR gates in FIG. 6 so that there is a 1 output from the OR circuit when there is an output from one of the OR gates. However, in the case of no OR gates 85*a*–85*d* producing an output, the OR circuit 86 will lose its output indicating that it is an invalid $k$ where $i' = j'$ which is equal to 0. The $i'$ and $j'$ values generated by the table generator 82 are fed to separate binary adders 87,88 respectively. The other input to the binary adders 87,88 is the $p$ value generated in the binary encoder 62 as shown in FIG. 1. The respective adders 87,88 perform the addition $p + i'$ and $p + j'$ to give $i$ and $j$, respectively. $i$ and $j$ are binary numbers whose value represents the location of the positions $i$ and $j$ in error in the received information message. The adders 87,88 are shown in schematic form in FIG. 7 and are again adders of the type having end-around carry, the details of which can be found in the foregoing reference thereto. The $i$ and $j$ values are fed to a binary number decoder 89 where they are decoded into error position pointers.

Figure 8:
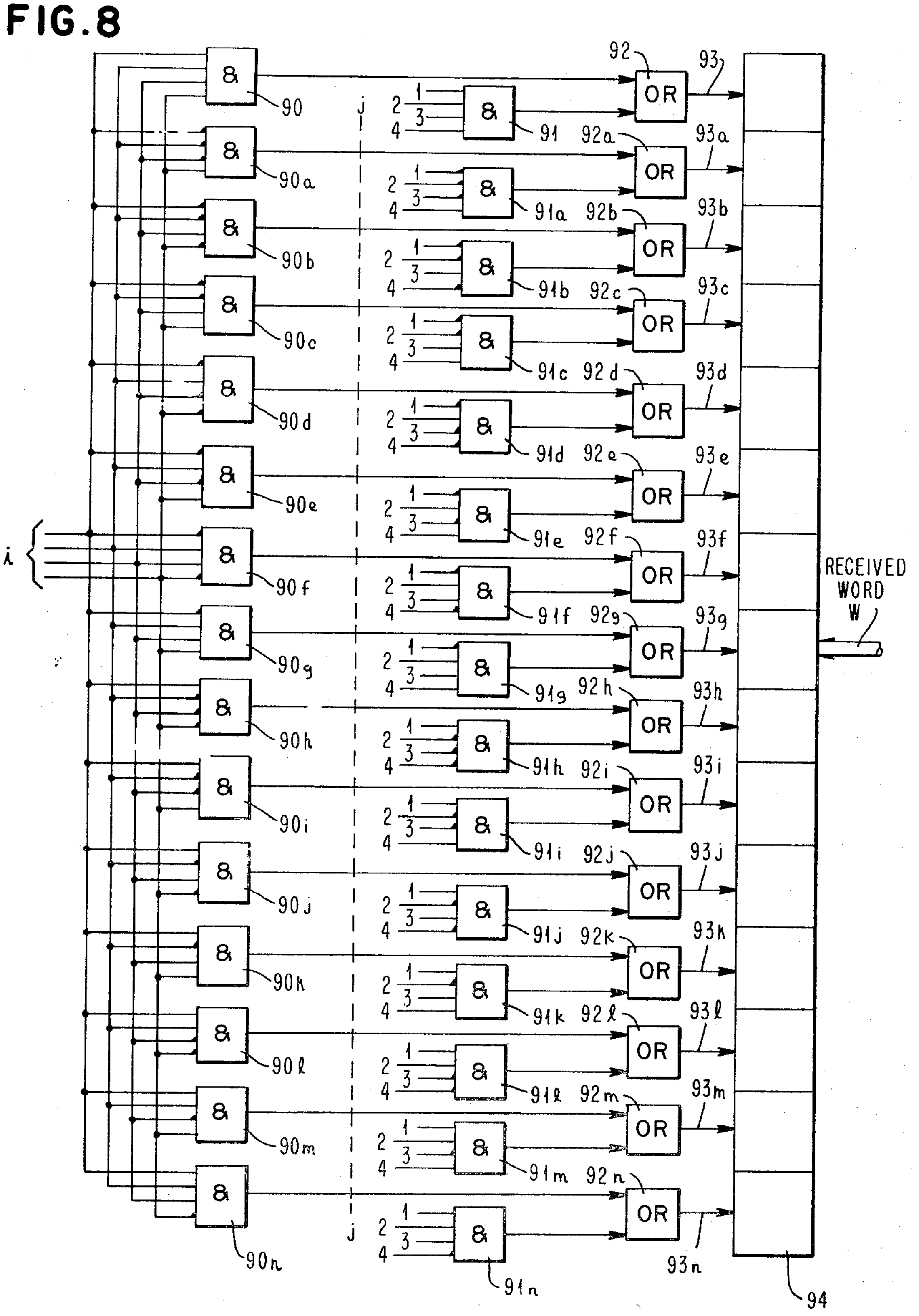
FIG. 8 is a schematic block diagram showing the decoding of the $i$ and $j$ values into error pointers.

The binary number decoder is shown in FIG. 8. The four-bit binary input $i$ is fed to each of 15 AND gates 90–90*n*, the inputs of which are coded with NOT circuits, each arranged to give an output when the binary numerical equivalent of the $i$ input corresponds to the circuit input coding arrangement. For example, the input binary number $i$ = 0001 will have the NOT circuits on the first, second and third input to AND circuit 90*a* so that the 0001 input will produce an output on AND circuit 90*a* only. Likewise, the $j$ input is a 4-bit binary input which is fed as inputs to each of AND circuits 91–91*n*. The input connections to the AND circuits 91–91*n* are coded numerically by the appropriate use of NOT circuits so that an output is produced when the $j$ input corresponds to the coding of the AND input. The output from corresponding AND circuits, for example, 90*a* and 91*a*, in the $i$ and $j$ groups of AND circuits are OR'ed together by OR circuits 92–92*n* to produce an output from one or the other of the AND circuits. Thus, the output of the OR circuits 92–92*n* are pointers 93–93*n* which indicate the location of the $i$ and $j$ errors in the received word. These pointers 93–93*n* are connected to a register 94 containing the received word to cause the corresponding position of the register to reverse the bit in the location designated.

The various steps of the invention performed by the above-described circuits are reiterated.

Step 1. Obtain the syndrome S from the received message W.

Step 2. Divide the syndrome into two separate syndromes $S_1$ and $S_3$ and equate them to $\beta$ and $\gamma$ as follows:

$$S=\begin{bmatrix}S_1\\S_3\end{bmatrix}=\begin{bmatrix}\beta\\\gamma\end{bmatrix}=\begin{bmatrix}\alpha^p\\\alpha^q\end{bmatrix}$$

Step 3. Encode $p$, $(-3p)$ and $q$ as $m$ bit binary numbers. In the example given above, $m = 4$.

Step 4. Obtain $k = q + (-3p)$.

Step 5. From the Table II, find $i'$ and $j'$ corresponding to $k$.

Step 6. Obtain $i = p + i'$ and $j = p + j'$.

Step 7. Decode $i$ and $j$ into error pointers.

It should be clear that the above procedure does not require any steering logic or counters. All the operations are performed by combinational logic in a pipeline mode, with a significant savings in hardware. It can be seen from Steps 2 and 3 that the syndrome is identified by means of two binary numbers $p$ and $q$. Step 4 determines the entry $k$ in the table of step 5 by the use of a binary adder. It should be appreciated that the Table consists of $n+1/2$ entries corresponding to the syndrome instead of the otherwise required $n^2+n/2$ entries ordinarily required to identify the syndrome. The actual error pattern is determined in Step 6 using an adder operation which has as inputs the numbers obtained from the table and the parameter $p$. In Step 7 the actual error positions are decoded. This allows actual data bit positions to be numbered independently for geometric locations and algebraic processing since the error pointer establishes the geometric position independent of its algebraic identification. This added flexibility allows the use of a different parity check matrix for encoding.

It should be appreciated that the two error correction invention described is operable on longer code words using the same BCH coding scheme described by the parity check matrix (15). It will be also understood that a code word of shorter length may be used by simply eliminating a fixed number of digits at any of the positions of the full length code words. In the case of such shortened codes, an error indicated in the eliminated locations can be utilized for the detection of multiple errors.

While the invention has been particularly shown and described with reference to a preferred embodiment thereof, it will be understood by those skilled in the art that the various changes in form and detail may be made therein without departing from the spirit and scope of the invention.

What is claimed is:

1. In a system for correcting double errors utilizing a message encoded for transmission according to the matrix:

$$\begin{bmatrix} \alpha^1\alpha^2\alpha^3 \cdots \alpha^n \\ (\alpha^1)^3(\alpha^2)^3(\alpha^3)^3 \cdots (\alpha^n)^3 \end{bmatrix}$$

where the code length $n$ is given by $2^m-1$ and $\alpha$ is a primitive element of $GF(2^m)$ represented by a binary column vector, a decoding means for the encoded received message comprising:

syndrome generation means for generating a syndrome indicative of errors in digit position $i$ and $j$ of said received message, said syndrome being generated in the following form:

$$S=\begin{bmatrix} S_1 \\ S_3 \end{bmatrix}=\begin{bmatrix} \alpha^i\oplus\alpha^j \\ \alpha^{3i}\oplus\alpha^{3j} \end{bmatrix}=\begin{bmatrix} \alpha^p \\ \alpha^q \end{bmatrix}$$

means for mapping said syndrome S into a basic syndrome S' having the following form:

$$S'=\begin{bmatrix} S'_1 \\ S'_3 \end{bmatrix}=\begin{bmatrix} \alpha^0 \\ \alpha^{q-3p} \end{bmatrix}=\begin{bmatrix} \alpha^{i-p}\oplus\alpha^{j-p} \\ \alpha^{3(i-p)}\oplus\alpha^{3(j-p)} \end{bmatrix}$$

further means for mapping the error positions corresponding to the basic syndrome S' into error locations $i$ and $j$ where the errors are corrected.

2. In a system according to claim 1, wherein said syndrome generation means includes syndrome decoding means for decoding said syndrome in two parts $S_1$ and $S_3$ as field elements $\beta$ and $\gamma$, respectively.

3. In a system according to claim 2, wherein said means for mapping said syndrome S into a basic syndrome S' includes binary encoding means for encoding field elements $\beta$, $1/\beta^3$ and $\gamma$ with $m$ bit binary numbers representing P, $(-3p)$ mod $n$ and $q$, respectively, where $\beta=\alpha^p$ and $\gamma=\alpha^q$.

4. In a system according to claim 3, wherein said means for mapping said syndrome S into a basic syndrome S' further includes a first binary adding means for adding $q+(-3p)$ mod $n$ which $=k$.

5. In a system according to claim 4, wherein said means for mapping said syndrome S into a basic syndrome S' further including a table generating means for generating predetermined values of $i'$ and $j'$ for the various $k$'s determined by said first adding means.

6. In a system according to claim 5, wherein said further means for mapping the error positions corresponding to the basic syndrome S' into error locations $i$ and $j$ include a second and third binary adding means for adding $i'+p$ mod $n$ which equals $i$ and $j'+p$ mod n which equals $j$, respectively.

7. In a system according to claim 6, wherein said further means for mapping the error positions corresponding to the basic syndrome S' into error locations $i$ and $j$ include a binary number decoding means for decoding the binary numbers $i$ and $j$ into error position pointers for indicating the locations of the positions in error.

8. In a system according to claim 2, wherein said syndrome decoding means includes uncorrectable error recognizing means represented by $\beta=\phi$.

9. In a system according to claim 2, wherein said syndrome decoding means includes single error recognizing means operable when $\gamma=\beta^3$.

10. In a system according to claim 4, wherein said first binary adding means has the output thereof assigned a 0 value if $\gamma=\phi$.

11. In a system according to claim 5 wherein said table generating means includes further uncorrectable error recognizing means when $i'=j'=0$ which indicates an invalid value of $k$ and provides an output indicating an uncorrectable error.

12. In a system according to claim 7, wherein said binary number decoding means includes invalid $i$ or $j$ recognizing means which produces an uncorrectable error indication in response thereto.

* * * * *